(12) United States Patent  
Cook, Jr. et al.

(10) Patent No.: US 8,010,431 B1
(45) Date of Patent: Aug. 30, 2011

(54) SYSTEM AND METHOD FOR FINANCING VESSELS

(76) Inventors: Harry Clayton Cook, Jr., McLean, VA (US); Patrick E. Ogle, Washington, DC (US)

( * ) Notice: Subject to any disclaimer, the term of this patent is extended or adjusted under 35 U.S.C. 154(b) by 95 days.

(21) Appl. No.: 12/588,550

(22) Filed: Oct. 19, 2009

Related U.S. Application Data

(60) Provisional application No. 61/106,828, filed on Oct. 20, 2008.

(51) Int. Cl.
*G06Q 40/00* (2006.01)
(52) U.S. Cl. .......................................................... 705/35
(58) Field of Classification Search ................ 705/35
See application file for complete search history.

(56) References Cited

U.S. PATENT DOCUMENTS 6,684,190 B1 * 1/2004 Powers et al. ............... 705/36 R

OTHER PUBLICATIONS

"NMFS Overview of Capital Construction Fund", Alaska Sea Grant Marine Advisory Program, Sep. 8, 2008 Archive of <http://seagrant.uaf.edu/map/workshops/2008/business/fishing/handouts/capconstfund.pdf>, accessed via Internet Archive Wayback Machine <http://wayback.archive.org>.*

* cited by examiner

*Primary Examiner* — Lindsay M Maguire
*Assistant Examiner* — Eric T Wong
(74) *Attorney, Agent, or Firm* — Drinker Biddle & Reath LLP

(57) ABSTRACT

A method for controlling a computer to price a vessel transaction utilizing a capital construction fund (CCF) and system thereof. The method includes retrieving input from a user regarding at least transaction information including financing, CCF account information, and purchaser information. The input is used to calculate amounts to be added to a CCF Capital Account to be used in combination with the income created on the CCF Capital Account to pay principal payments on a financed vessel. The method also includes calculations of tax liabilities that may be incurred through the use of the CCF.

20 Claims, 22 Drawing Sheets

600

Capital Construction Fund Analysis - Input Fields

| Description of Input Field | Input Fields |
|---|---|
| Debt Payments Per Year (1, 2, 4, or 12) | 1 |
| Term of Debt (Years) | 20 |
| Investment Rate of Return | 7.00% |
| Net Present Value Discount Rate | 5.00% |
| Effective Tax Rate | 35.00% |
| Tax Book Value at Beginning of Year of Delivery | $105,236,054 |
| Principal Payments (Fixed or Variable) | Fixed * |
|    If Fixed Principal Payments, Enter Amount of Fixed Payment | $4,604,077 |
|    If Variable Principal Payments, Complete Schedule of Payments | See Schedule |

Figure 7

Capital Construction Fund Analysis - Vessel Depreciation Schedule

| Year | Double Declining Balance Depreciation | Straight Line Depreciation | Straight Line Depreciation Rate After Crossover | Applicable Crossover Depreciation Amount | Tax Book Value at Beginning of Year Under DDB Depreciation | Tax Book Value at Beginning of Year Under Straight Line Depreciation | Tax Book Value at Beginning of Year Under Crossover Depreciation |
|---|---|---|---|---|---|---|---|
| 0 | $0 | $0 | $0 | $0 | $105,236,054 | $105,236,054 | $105,236,054 |
| 1 | $10,523,605 | $5,261,803 | $0 | $10,523,605 | $94,712,448 | $99,974,251 | $94,712,448 |
| 2 | $9,471,245 | $5,261,803 | $7,285,573 | $9,471,245 | $85,241,203 | $94,712,448 | $85,241,203 |
| 3 | $8,524,120 | $5,261,803 | $6,557,016 | $8,524,120 | $76,717,083 | $89,450,646 | $76,717,083 |
| 4 | $7,671,708 | $5,261,803 | $5,901,314 | $7,671,708 | $69,045,375 | $84,188,843 | $69,045,375 |
| 5 | $6,904,537 | $5,261,803 | $5,311,183 | $6,904,537 | $62,140,837 | $78,927,040 | $62,140,837 |
| 6 | $6,214,084 | $5,261,803 | $4,780,064 | $6,214,084 | $55,926,754 | $73,665,238 | $55,926,754 |
| 7 | $5,592,675 | $5,261,803 | $4,302,058 | $5,592,675 | $50,334,078 | $68,403,435 | $50,334,078 |
| 8 | $5,033,408 | $5,261,803 | $3,871,852 | $3,871,852 | $45,300,670 | $63,141,632 | $46,462,226 |
| 9 | $4,530,067 | $5,261,803 | $3,871,852 | $3,871,852 | $40,770,603 | $57,879,830 | $42,590,374 |
| 10 | $4,077,060 | $5,261,803 | $3,871,852 | $3,871,852 | $36,693,543 | $52,618,027 | $38,718,522 |
| 11 | $3,669,354 | $5,261,803 | $3,871,852 | $3,871,852 | $33,024,189 | $47,356,224 | $34,846,670 |
| 12 | $3,302,419 | $5,261,803 | $3,871,852 | $3,871,852 | $29,721,770 | $42,094,421 | $30,974,817 |
| 13 | $2,972,177 | $5,261,803 | $3,871,852 | $3,871,852 | $26,749,593 | $36,832,619 | $27,102,965 |
| 14 | $2,674,959 | $5,261,803 | $3,871,852 | $3,871,852 | $24,074,634 | $31,570,816 | $23,231,113 |
| 15 | $2,407,463 | $5,261,803 | $3,871,852 | $3,871,852 | $21,667,170 | $26,309,013 | $19,359,261 |
| 16 | $2,166,717 | $5,261,803 | $3,871,852 | $3,871,852 | $19,500,453 | $21,047,211 | $15,487,409 |
| 17 | $1,950,045 | $5,261,803 | $3,871,852 | $3,871,852 | $17,550,408 | $15,785,408 | $11,615,557 |
| 18 | $1,755,041 | $5,261,803 | $3,871,852 | $3,871,852 | $15,795,367 | $10,523,605 | $7,743,704 |
| 19 | $1,579,537 | $5,261,803 | $3,871,852 | $3,871,852 | $14,215,830 | $5,261,803 | $3,871,852 |
| 20 | $1,421,583 | $5,261,803 | $3,871,852 | $3,871,852 | $12,794,247 | ($0) | ($0) |

Capital Construction Fund Analysis - Capital Account

| | Assumptions | | Capital Account | | | |
|---|---|---|---|---|---|---|
| Year | Annual Principal Payments | Annual Depreciation | Account Balance at Beginning of Year | Yearly Deposits | Yearly Withdrawals | Account Balance at End of Year |
| 1 | $ 4,604,077 | $ 10,523,605 | $ - | $ 10,523,605 | $ 4,604,077 | $ 5,919,528 |
| 2 | $ 4,604,077 | $ 9,471,245 | $ 5,919,528 | $ 9,471,245 | $ 4,604,077 | $ 10,786,696 |
| 3 | $ 4,604,077 | $ 8,524,120 | $ 10,786,696 | $ 8,524,120 | $ 4,604,077 | $ 14,706,739 |
| 4 | $ 4,604,077 | $ 7,671,708 | $ 14,706,739 | $ 7,671,708 | $ 4,604,077 | $ 17,774,369 |
| 5 | $ 4,604,077 | $ 6,904,537 | $ 17,774,369 | $ 6,904,537 | $ 4,604,077 | $ 20,074,830 |
| 6 | $ 4,604,077 | $ 6,214,084 | $ 20,074,830 | $ 6,214,084 | $ 4,604,077 | $ 21,684,836 |
| 7 | $ 4,604,077 | $ 5,592,675 | $ 21,684,836 | $ 5,592,675 | $ 4,604,077 | $ 22,673,434 |
| 8 | $ 4,604,077 | $ 3,871,852 | $ 22,673,434 | $ 2,582,688 | $ 4,604,077 | $ 20,652,045 |
| 9 | $ 4,604,077 | $ 3,871,852 | $ 20,652,045 | $ - | $ 4,604,077 | $ 16,047,967 |
| 10 | $ 4,604,077 | $ 3,871,852 | $ 16,047,967 | $ - | $ 4,604,077 | $ 11,443,890 |
| 11 | $ 4,604,077 | $ 3,871,852 | $ 11,443,890 | $ - | $ 4,604,077 | $ 6,839,813 |
| 12 | $ 4,604,077 | $ 3,871,852 | $ 6,839,813 | $ - | $ 4,604,077 | $ 2,235,735 |
| 13 | $ 4,604,077 | $ 3,871,852 | $ 2,235,735 | $ - | $ 2,235,735 | $ - |
| 14 | $ 4,604,077 | $ 3,871,852 | $ - | $ - | $ - | $ - |
| 15 | $ 4,604,077 | $ 3,871,852 | $ - | $ - | $ - | $ - |
| 16 | $ 4,604,077 | $ 3,871,852 | $ - | $ - | $ - | $ - |
| 17 | $ 4,604,077 | $ 3,871,852 | $ - | $ - | $ - | $ - |
| 18 | $ 4,604,077 | $ 3,871,852 | $ - | $ - | $ - | $ - |
| 19 | $ 4,604,077 | $ 3,871,852 | $ - | $ - | $ - | $ - |
| 20 | $ 4,604,077 | $ 3,871,852 | $ - | $ - | $ - | $ - |

Figure 9

Capital Construction Fund Analysis - Income on Capital Account

| Year | Account Balance at Beginning of Year | Yearly Deposits | Yearly Withdrawals | Account Balance at End of Year |
|---|---|---|---|---|
| 1  | $ -          | $ 736,652   | $ -         | $ 736,652    |
| 2  | $ 736,652    | $ 1,077,354 | $ -         | $ 1,814,006  |
| 3  | $ 1,814,006  | $ 1,351,757 | $ -         | $ 3,165,764  |
| 4  | $ 3,165,764  | $ 1,566,491 | $ -         | $ 4,732,255  |
| 5  | $ 4,732,255  | $ 1,727,523 | $ -         | $ 6,459,778  |
| 6  | $ 6,459,778  | $ 1,840,224 | $ -         | $ 8,300,002  |
| 7  | $ 8,300,002  | $ 1,909,426 | $ -         | $ 10,209,428 |
| 8  | $ 10,209,428 | $ 1,767,929 | $ -         | $ 11,977,357 |
| 9  | $ 11,977,357 | $ 1,445,643 | $ -         | $ 13,423,000 |
| 10 | $ 13,423,000 | $ 1,123,358 | $ -         | $ 14,546,357 |
| 11 | $ 14,546,357 | $ 801,072   | $ -         | $ 15,347,430 |
| 12 | $ 15,347,430 | $ 478,787   | $ -         | $ 15,826,217 |
| 13 | $ 15,826,217 | $ 156,501   | $ 2,368,342 | $ 13,614,376 |
| 14 | $ 13,614,376 | $ -         | $ 4,604,077 | $ 9,010,299  |
| 15 | $ 9,010,299  | $ -         | $ 4,604,077 | $ 4,406,221  |
| 16 | $ 4,406,221  | $ -         | $ 4,406,221 | $ -          |
| 17 | $ -          | $ -         | $ -         | $ -          |
| 18 | $ -          | $ -         | $ -         | $ -          |
| 19 | $ -          | $ -         | $ -         | $ -          |
| 20 | $ -          | $ -         | $ -         | $ -          |

Figure 10

Capital Construction Fund Analysis - Income on Capital Account

| | Income on First Income Account | | | |
|---|---|---|---|---|
| Year | Account Balance at Beginning of Year | Yearly Deposits | Yearly Withdrawals | Account Balance at End of Year |
| 1 | $ - | $ - | $ - | $ - |
| 2 | $ - | $ 51,566 | $ - | $ 51,566 |
| 3 | $ 51,566 | $ 126,980 | $ - | $ 178,546 |
| 4 | $ 178,546 | $ 221,603 | $ - | $ 400,150 |
| 5 | $ 400,150 | $ 331,258 | $ - | $ 731,407 |
| 6 | $ 731,407 | $ 452,184 | $ - | $ 1,183,592 |
| 7 | $ 1,183,592 | $ 581,000 | $ - | $ 1,764,592 |
| 8 | $ 1,764,592 | $ 714,660 | $ - | $ 2,479,252 |
| 9 | $ 2,479,252 | $ 838,415 | $ - | $ 3,317,667 |
| 10 | $ 3,317,667 | $ 939,610 | $ - | $ 4,257,277 |
| 11 | $ 4,257,277 | $ 1,018,245 | $ - | $ 5,275,522 |
| 12 | $ 5,275,522 | $ 1,074,320 | $ - | $ 6,349,842 |
| 13 | $ 6,349,842 | $ 1,107,835 | $ - | $ 7,457,677 |
| 14 | $ 7,457,677 | $ 1,118,790 | $ - | $ 8,576,468 |
| 15 | $ 8,576,468 | $ 953,006 | $ - | $ 9,529,474 |
| 16 | $ 9,529,474 | $ 630,721 | $ 197,856 | $ 9,962,339 |
| 17 | $ 9,962,339 | $ 308,435 | $ 4,604,077 | $ 5,666,697 |
| 18 | $ 5,666,697 | $ - | $ 4,604,077 | $ 1,062,619 |
| 19 | $ 1,062,619 | $ - | $ 1,062,619 | $ - |
| 20 | $ - | $ - | $ - | $ - |

1100

Capital Construction Fund Analysis - Income on Capital Account

| Year | Account Balance at Beginning of Year | Yearly Deposits | Yearly Withdrawals | Account Balance at End of Year |
|---|---|---|---|---|
| | Income on Second Income Account | | | |
| 1 | $ - | $ - | $ - | $ - |
| 2 | $ - | $ - | $ - | $ - |
| 3 | $ - | $ 3,610 | $ - | $ 3,610 |
| 4 | $ 3,610 | $ 12,498 | $ - | $ 16,108 |
| 5 | $ 16,108 | $ 28,010 | $ - | $ 44,118 |
| 6 | $ 44,118 | $ 51,199 | $ - | $ 95,317 |
| 7 | $ 95,317 | $ 82,851 | $ - | $ 178,168 |
| 8 | $ 178,168 | $ 123,521 | $ - | $ 301,690 |
| 9 | $ 301,690 | $ 173,548 | $ - | $ 475,237 |
| 10 | $ 475,237 | $ 232,237 | $ - | $ 707,474 |
| 11 | $ 707,474 | $ 298,009 | $ - | $ 1,005,483 |
| 12 | $ 1,005,483 | $ 369,287 | $ - | $ 1,374,770 |
| 13 | $ 1,374,770 | $ 444,489 | $ - | $ 1,819,259 |
| 14 | $ 1,819,259 | $ 522,037 | $ - | $ 2,341,296 |
| 15 | $ 2,341,296 | $ 600,353 | $ - | $ 2,941,649 |
| 16 | $ 2,941,649 | $ 667,063 | $ - | $ 3,608,712 |
| 17 | $ 3,608,712 | $ 711,214 | $ - | $ 4,319,926 |
| 18 | $ 4,319,926 | $ 718,954 | $ - | $ 5,038,880 |
| 19 | $ 5,038,880 | $ 396,669 | $ 3,541,458 | $ 1,894,091 |
| 20 | $ 1,894,091 | $ 74,383 | $ 1,968,474 | $ - |

Figure 12

Capital Construction Fund Analysis - Income on Capital Account

| | Income on Third Income Account | | | |
|---|---|---|---|---|
| Year | Account Balance at Beginning of Year | Yearly Deposits | Yearly Withdrawals | Account Balance at End of Year |
| 1 | $ - | $ - | $ - | $ - |
| 2 | $ - | $ - | $ - | $ - |
| 3 | $ - | $ - | $ - | $ - |
| 4 | $ - | $ 253 | $ - | $ 253 |
| 5 | $ 253 | $ 1,128 | $ - | $ 1,380 |
| 6 | $ 1,380 | $ 3,088 | $ - | $ 4,469 |
| 7 | $ 4,469 | $ 6,672 | $ - | $ 11,141 |
| 8 | $ 11,141 | $ 12,472 | $ - | $ 23,612 |
| 9 | $ 23,612 | $ 21,118 | $ - | $ 44,731 |
| 10 | $ 44,731 | $ 33,267 | $ - | $ 77,997 |
| 11 | $ 77,997 | $ 49,523 | $ - | $ 127,521 |
| 12 | $ 127,521 | $ 70,384 | $ - | $ 197,904 |
| 13 | $ 197,904 | $ 96,234 | $ - | $ 294,138 |
| 14 | $ 294,138 | $ 127,348 | $ - | $ 421,486 |
| 15 | $ 421,486 | $ 163,891 | $ - | $ 585,377 |
| 16 | $ 585,377 | $ 205,915 | $ - | $ 791,293 |
| 17 | $ 791,293 | $ 252,610 | $ - | $ 1,043,902 |
| 18 | $ 1,043,902 | $ 302,395 | $ - | $ 1,346,297 |
| 19 | $ 1,346,297 | $ 352,722 | $ - | $ 1,699,019 |
| 20 | $ 1,699,019 | $ 380,488 | $ 2,079,507 | $ - |

Figure 13

Capital Construction Fund Analysis - Income on Capital Account

| | | Income on Fourth Income Account | | |
|---|---|---|---|---|
| Year | Account Balance at Beginning of Year | Yearly Deposits | Yearly Withdrawals | Account Balance at End of Year |
| 1 | $ - | $ - | $ - | $ - |
| 2 | $ - | $ - | $ - | $ - |
| 3 | $ - | $ - | $ - | $ - |
| 4 | $ - | $ - | $ - | $ - |
| 5 | $ - | $ 18 | $ - | $ 18 |
| 6 | $ 18 | $ 97 | $ - | $ 114 |
| 7 | $ 114 | $ 313 | $ - | $ 427 |
| 8 | $ 427 | $ 780 | $ - | $ 1,207 |
| 9 | $ 1,207 | $ 1,653 | $ - | $ 2,860 |
| 10 | $ 2,860 | $ 3,131 | $ - | $ 5,991 |
| 11 | $ 5,991 | $ 5,460 | $ - | $ 11,451 |
| 12 | $ 11,451 | $ 8,926 | $ - | $ 20,377 |
| 13 | $ 20,377 | $ 13,853 | $ - | $ 34,231 |
| 14 | $ 34,231 | $ 20,590 | $ - | $ 54,820 |
| 15 | $ 54,820 | $ 29,504 | $ - | $ 84,324 |
| 16 | $ 84,324 | $ 40,976 | $ - | $ 125,301 |
| 17 | $ 125,301 | $ 55,390 | $ - | $ 180,691 |
| 18 | $ 180,691 | $ 73,073 | $ - | $ 253,764 |
| 19 | $ 253,764 | $ 94,241 | $ - | $ 348,005 |
| 20 | $ 348,005 | $ 118,931 | $ 466,936 | $ - |

Figure 14

Capital Construction Fund Analysis - Income on Capital Account

| | Income on Fifth Income Account | | | |
|---|---|---|---|---|
| Year | Account Balance at Beginning of Year | Yearly Deposits | Yearly Withdrawals | Account Balance at End of Year |
| 1 | $ - | $ - | $ - | $ - |
| 2 | $ - | $ - | $ - | $ - |
| 3 | $ - | $ - | $ - | $ - |
| 4 | $ - | $ - | $ - | $ - |
| 5 | $ - | $ - | $ - | $ - |
| 6 | $ - | $ 1 | $ - | $ 1 |
| 7 | $ 1 | $ 8 | $ - | $ 9 |
| 8 | $ 9 | $ 30 | $ - | $ 39 |
| 9 | $ 39 | $ 84 | $ - | $ 124 |
| 10 | $ 124 | $ 200 | $ - | $ 324 |
| 11 | $ 324 | $ 419 | $ - | $ 743 |
| 12 | $ 743 | $ 802 | $ - | $ 1,545 |
| 13 | $ 1,545 | $ 1,426 | $ - | $ 2,971 |
| 14 | $ 2,971 | $ 2,396 | $ - | $ 5,367 |
| 15 | $ 5,367 | $ 3,837 | $ - | $ 9,205 |
| 16 | $ 9,205 | $ 5,903 | $ - | $ 15,107 |
| 17 | $ 15,107 | $ 8,771 | $ - | $ 23,878 |
| 18 | $ 23,878 | $ 12,648 | $ - | $ 36,527 |
| 19 | $ 36,527 | $ 17,764 | $ - | $ 54,290 |
| 20 | $ 54,290 | $ 24,360 | $ 78,651 | $ - |

Figure 15

Capital Construction Fund Analysis - Income on Capital Account

| | Income on Sixth Income Account | | | |
|---|---|---|---|---|
| Year | Account Balance at Beginning of Year | Yearly Deposits | Yearly Withdrawals | Account Balance at End of Year |
| 1 | $ - | $ - | $ - | $ - |
| 2 | $ - | $ - | $ - | $ - |
| 3 | $ - | $ - | $ - | $ - |
| 4 | $ - | $ - | $ - | $ - |
| 5 | $ - | $ - | $ - | $ - |
| 6 | $ - | $ - | $ - | $ - |
| 7 | $ - | $ 0 | $ - | $ 0 |
| 8 | $ 0 | $ 1 | $ - | $ 1 |
| 9 | $ 1 | $ 3 | $ - | $ 3 |
| 10 | $ 3 | $ 9 | $ - | $ 12 |
| 11 | $ 12 | $ 23 | $ - | $ 35 |
| 12 | $ 35 | $ 52 | $ - | $ 87 |
| 13 | $ 87 | $ 108 | $ - | $ 195 |
| 14 | $ 195 | $ 208 | $ - | $ 403 |
| 15 | $ 403 | $ 376 | $ - | $ 779 |
| 16 | $ 779 | $ 644 | $ - | $ 1,423 |
| 17 | $ 1,423 | $ 1,058 | $ - | $ 2,480 |
| 18 | $ 2,480 | $ 1,671 | $ - | $ 4,152 |
| 19 | $ 4,152 | $ 2,557 | $ - | $ 6,709 |
| 20 | $ 6,709 | $ 3,800 | $ 10,509 | $ - |

1600

Capital Construction Fund Analysis - Summary Information

| | Summary Information | | | |
|---|---|---|---|---|
| Year | Total CCF Income from Capital and Income Accounts: Balance at Beginning of | Total CCF Income from Capital and Income Accounts: Yearly Deposits | Total CCF Income from Capital and Income Accounts: Yearly Withdrawals | Total CCF Income from Capital and Income Accounts: Balance at End of Year |
| 1 | $ - | $ 736,652 | $ - | $ 736,652 |
| 2 | $ 736,652 | $ 1,128,920 | $ - | $ 1,865,572 |
| 3 | $ 1,865,572 | $ 1,482,347 | $ - | $ 3,347,919 |
| 4 | $ 3,347,919 | $ 1,800,846 | $ - | $ 5,148,765 |
| 5 | $ 5,148,765 | $ 2,087,937 | $ - | $ 7,236,702 |
| 6 | $ 7,236,702 | $ 2,346,793 | $ - | $ 9,583,495 |
| 7 | $ 9,583,495 | $ 2,580,270 | $ - | $ 12,163,765 |
| 8 | $ 12,163,765 | $ 2,619,392 | $ - | $ 14,783,158 |
| 9 | $ 14,783,157 | $ 2,480,464 | $ - | $ 17,263,621 |
| 10 | $ 17,263,618 | $ 2,331,811 | $ - | $ 19,595,429 |
| 11 | $ 19,595,421 | $ 2,172,752 | $ - | $ 21,768,172 |
| 12 | $ 21,768,150 | $ 2,002,557 | $ - | $ 23,770,707 |
| 13 | $ 23,770,655 | $ 1,820,447 | $ 2,368,342 | $ 23,222,760 |
| 14 | $ 23,222,652 | $ 1,791,370 | $ 4,604,077 | $ 20,409,944 |
| 15 | $ 20,409,736 | $ 1,750,967 | $ 4,604,077 | $ 17,556,626 |
| 16 | $ 17,556,250 | $ 1,551,223 | $ 4,604,077 | $ 14,503,396 |
| 17 | $ 14,502,751 | $ 1,337,478 | $ 4,604,077 | $ 11,236,152 |
| 18 | $ 11,235,095 | $ 1,108,742 | $ 4,604,077 | $ 7,739,759 |
| 19 | $ 7,738,088 | $ 863,952 | $ 4,604,077 | $ 3,997,962 |
| 20 | $ 4,002,114 | $ 601,964 | $ 4,604,077 | $ 0 |

Figure 17

Capital Construction Fund Analysis - Withdrawals, Taxation & Final Balance

1700

| Total Withdrawals | Taxable Events | | CCF Balance at End of Year |
|---|---|---|---|
| | CCF Adjusted Tax Book Value at End of Year End | Non-Qualified Yearly Withdrawals | |
| $ 4,604,077 | $ 94,712,448 | $ - | $ 6,656,180 |
| $ 4,604,077 | $ 85,241,203 | $ - | $ 12,652,268 |
| $ 4,604,077 | $ 76,717,083 | $ - | $ 18,054,658 |
| $ 4,604,077 | $ 69,045,375 | $ - | $ 22,923,134 |
| $ 4,604,077 | $ 62,140,837 | $ - | $ 27,311,532 |
| $ 4,604,077 | $ 55,926,754 | $ - | $ 31,268,331 |
| $ 4,604,077 | $ 50,334,078 | $ - | $ 34,837,199 |
| $ 4,604,077 | $ 46,462,226 | $ - | $ 35,435,202 |
| $ 4,604,077 | $ 42,590,374 | $ - | $ 33,311,588 |
| $ 4,604,077 | $ 38,718,522 | $ - | $ 31,039,319 |
| $ 4,604,077 | $ 34,846,670 | $ - | $ 28,607,985 |
| $ 4,604,077 | $ 30,974,817 | $ - | $ 26,006,442 |
| $ 4,604,077 | $ 24,734,623 | $ - | $ 23,222,760 |
| $ 4,604,077 | $ 16,258,694 | $ - | $ 20,409,944 |
| $ 4,604,077 | $ 7,782,764 | $ - | $ 17,556,626 |
| $ 4,604,077 | $ - | $ 4,604,077 | $ 14,503,396 |
| $ 4,604,077 | $ - | $ 4,604,077 | $ 11,236,152 |
| $ 4,604,077 | $ - | $ 4,604,077 | $ 7,739,759 |
| $ 4,604,077 | $ - | $ 4,604,077 | $ 3,997,962 |
| $ 4,604,078 | $ - | $ 4,604,077 | $ 0 |

Figure 18

Capital Construction Fund Analysis - Output Fields

| Output Field Descriptions | Output Fields | |
|---|---|---|
| CCF Contributions | Real Cash Flow | NPV of Cash Flow |
| Year One | $ 10,523,605 | $ 10,022,481 |
| Year Two | $ 9,471,245 | $ 8,590,698 |
| Year Three | $ 8,524,120 | $ 7,363,456 |
| Year Four | $ 7,671,708 | $ 6,311,533 |
| Year Five | $ 6,904,537 | $ 5,409,886 |
| Year Six | $ 6,214,084 | $ 4,637,045 |
| Year Seven | $ 5,592,675 | $ 3,974,610 |
| Year Eight | $ 2,582,688 | $ 1,748,065 |
| Year Nine | $ - | $ - |
| Year Ten | $ - | $ - |
| Year Eleven | $ - | $ - |
| Year Twelve | $ - | $ - |
| Year Thirteen | $ - | $ - |
| Year Fourteen | $ - | $ - |
| Year Fifteen | $ - | $ - |
| Year Sixteen | $ - | $ - |
| Year Seventeen | $ - | $ - |
| Year Eighteen | $ - | $ - |
| Year Nineteen | $ - | $ - |
| Year Twenty | $ - | $ - |
| Total CCF Contributions | $ 57,484,663 | $ 48,057,774 |

Figure 19

Capital Construction Fund Analysis - Output Fields

| Output Field Descriptions | Output Fields | |
|---|---|---|
| Tax Liability* | Real Cash Flow | NPV of Cash Flow |
| Year One | $ - | $ - |
| Year Two | $ - | $ - |
| Year Three | $ - | $ - |
| Year Four | $ - | $ - |
| Year Five | $ - | $ - |
| Year Six | $ - | $ - |
| Year Seven | $ - | $ - |
| Year Eight | $ - | $ - |
| Year Nine | $ - | $ - |
| Year Ten | $ - | $ - |
| Year Eleven | $ - | $ - |
| Year Twelve | $ - | $ - |
| Year Thirteen | $ - | $ - |
| Year Fourteen | $ - | $ - |
| Year Fifteen | $ - | $ - |
| Year Sixteen | $ 1,611,427 | $ 1,038,740 |
| Year Seventeen | $ 1,611,427 | $ 1,038,740 |
| Year Eighteen | $ 1,611,427 | $ 1,038,740 |
| Year Nineteen | $ 1,611,427 | $ 1,038,740 |
| Year Twenty | $ 1,611,427 | $ 1,038,740 |
| Total Tax Liability | $ 8,057,135 | $ 5,193,701 |

* Taxable Withdrawals will occur in tax years when principal payments are made from CCF Income Accounts and the vessel has been fully depreciated.

Figure 20

SYSTEM AND METHOD FOR FINANCING VESSELS

CROSS-REFERENCE TO PRIOR APPLICATION

This application claims benefit from U.S. Provisional Application No. 61/106,828 filed Oct. 20, 2008. The entire content of which is incorporated herein by reference.

FIELD

The present disclosure relates to a system and method for financing. More particularly, the present disclosure relates to a system and method for financing maritime vessels utilizing a capital construction fund (CCF) including pricing financed vessels and managing a CCF to lower the cost of purchasing a maritime vessel.

BACKGROUND

In the discussion of the background that follows, reference is made to certain methods. However, these references are not to be construed as an admission that these methods constitute prior art. Applicant expressly reserves the right to demonstrate that such methods do not qualify as prior art.

A $20^{th}$ Century History. The availability of a fleet of U.S. citizen privately owned vessels suitable for and capable of meeting the nation's needs for the carriage of its domestic commerce and a substantial portion the its foreign commerce, that will be available to meet the nation's needs in time of war or national emergency, has been a recognized objective of national government policy almost since the founding of the republic. The twentieth century enactments of the Shipping Act, 1916, the Merchant Marine Act, 1920, the Merchant Marine Act, 1927, the Merchant Marine Act, 1936 (the "1936 Act"), and the Merchant Marine Act of 1970 (the "1970 Act") and the Federal Ship Financing Act of 1972 (the "1972 Act") all provide evidence of the continuing recognition of the important national interests involved.

During the twentieth century, a series of national government programs were developed to facilitate the U.S. citizen ownership and operation of U.S. flag vessels, and to thereby assist the national government in achieving and maintaining these maritime objectives. Two of the most important of these programs, a capital reserve tax deferral program, and a mortgage insurance loan guarantee program, originally contained respectively in Title VI and Title XI of the 1936 Act, were intended to assist in vessel financing. These two programs were renamed and substantially modified in the 1970 Act and 1972 Act. And, as now authorized in Chapter 535, Capital Construction Funds, and Chapter 537, Loans and Guarantees, of Title 46 of the U.S. Code, they are administered by the Maritime Administration ("MARAD"), in the U.S. Department of Transportation, and are commonly referred to as the capital construction fund "CCF" tax deferral program (the "CCF Program") and the "Title XI" financing guarantee program (the "Title XI Program").

Most simply stated, the CCF Program enables qualified U.S. flag vessel owners and operators the accumulate the equity for fleet replacement over a period of up to 25 years under the terms of MARAD tax deferral contract agreements, while the Title XI Program enables qualified owners and to access private sector commercial vessel financing with terms of up to 25 years matched to vessel service lives by means of MARAD contract U.S. Treasury debt financing guarantees.

When available, the CCF Program can materially shorten the time required for the accumulation of equity funds necessary for a vessel purchase and materially lessen the cash flow requirements for servicing vessel debt. Where the Title XI Program is available, the borrower's Treasury related interest rates will almost always favorably compare to the rates that can be otherwise achieved, and the 25 year maturities are well-suited for financing long-lived U.S. flag vessel assets.

Merchant Marine Act of 1970 Program. The Nixon Administration's "Merchant Marine Act of 1970 Program" (the "1970 Act Program") was designed to provide the means for the modernization of an aging U.S. flag commercial fleet. MARAD leadership and sponsored efforts under the 1970 Act Program resulted in the construction of more than $4 billion in new U.S. flag commercial vessel construction in the 1970s, which included series production of selected MARAD approved vessel designs. The Title XI Program played an essential role in providing the long-term, low-cost financing for this construction, and was employed by a variety of vessel owner-operators and owner-lessors in financing more than 9 out of 10 of the vessels constructed. The CCF Program was used by owner-operators to accelerate vessel debt repayment and to accumulate equity for fleet expansions making use of "before tax" deferred vessel earnings. While the majority of this 1970 Act Program construction involved owner-operator purchases of vessels for their own fleet operations, some operators chose to lease rather than purchase vessels needed for their operations. In their most basic form these transactions frequently involved the ownership of the vessel by a U.S. citizen financial institution owner-lessor, with the vessel demised (or "bareboat") chartered to a U.S. citizen operator-lessee, which then time chartered the vessel to a credit worthy end user for a period sufficient to meet the owner-lessor's credit requirements but not in excess of the Internal Revenue Service leasing guidelines.

These lease financing transactions were often characterized by the owner-lessor's use of the MARAD Title XI Program for their vessel mortgage secured debt, which was generally in the range of 75 percent to 87.5 percent. However, the CCF Program was generally ignored in these lease financing transactions because no methodology for measuring its benefits in long-term charter transactions was available.

Purchase vs. Charter. Charter lease hire payable by an operator-lessee during the initial years of a demise charter will most often be less that the debt service payments that the operator would have been required to make in a vessel purchase. However, over a vessel's useful life leasing will seldom be less expensive for a vessel operator than outright ownership and mortgage backed financing. An exception can exist in situations where the owner-lessor can make immediate use of significant tax benefits which the vessel operator cannot use, and will pass on a sufficient portion of these benefits in the form of a reduced charter hire. And, the owner-lessors ability to accurately quantify the measure of the transaction tax benefits will be critical to tax benefit pass through leasing structures.

A $21^{st}$ Century Problem. In Europe and the United States the past half dozen years have born increasing witness to highway traffic congestion concerns and to the use of water transport as a possible supplement and alternative. The European Community has moved to embrace water transport for its container and ro/ro traffic on "Motorways of the Sea."

In the United States, multiple "choke points" and miles of bumper-to-bumper traffic characterize travel on major highways that run parallel to ocean coastal waters. Everyone agrees that these coastal waters "could" provide additional transportation capacity. Successive Secretaries at the Department of Transportation ("DOT") and reports from the Government Office of Accountability have spoken of the need for a comprehensive Federal maritime transportation program that would foster such planning.

With the enactment of the Marine Transportation sections of the Energy Independence and Security Act of 2007 (the "2007 Act"), the Congress provided the Secretary of Transportation (the "Secretary") with the authority for such a program—to facilitate DOT and State and local government collaborations, and to attract public and private sector investment for short sea transportation ("SST") infrastructure projects to access the potential of our Nation's ocean highways. In so doing, the Congressional sponsors recognized the importance of the CCF Program and extended its application to "short sea transportation" applications in all U.S. waterborne trades.

Acting to fulfill 2007 Act responsibilities, DOT and MARAD have initiated an ambitious America's Marine Highway program. However, the means to finance the vessels necessary to access America's Marine Highways remain somewhat uncertain. Coastal freight services designed to encourage vehicle traffic movement from the nations Interstate Highways to the new U.S. "Motorways of the Sea" will require substantial capital investments. The MARAD Title XI and CCF vessel financing support programs will be the principal focus of attention. Vessel lease financing might offer an attractive alternative to vessel purchases for such coastal start-up operations. The Title XI Program has proven applicability for vessel purchase and leasing situations, but is only available based upon authorization and appropriation legislation, that is subject to Congressional and Administration budgetary concerns. And, while the CCF Program is not budget limited, its complexity, and the difficulties involved in measuring its benefits, have almost always precluded its use by owner-lessors in vessel lease financing transactions.

Operation of the CCF Program. The CCF Program provides for the accumulation of capital necessary for the acquisition, construction or reconstruction of U.S. built vessels over a period not in excess of 25 years on a before-tax basis. This is accomplished through the deferral of federal (and in most instances state) income taxes, on income from the operations and sales of designated agreement vessels, when deposited (and income on such deposits) under the terms of a CCF Program agreement (the "Agreement") between MARAD and an eligible U.S. citizen participant (the "Participant").

In these Agreements the Participant commits to a scheduled program of vessel construction and reconstruction projects that will advance the MARAD program objectives. In exchange for this Participant undertaking, MARAD commits the United States government to the deferral of tax on monies Participant will deposit to finance these projects. Unlike other federal income tax benefits governed by the Internal Revenue Code of 1986, the Participant's tax benefits are contractual, as negotiated and agreed by MARAD and the Participant under the terms of the Agreement.

As drafted by the then Director and Staff members of the Joint Committee on Taxation, the provisions of the tax deferral program in Public Law 91-469 were intended to function as a self-contained miniature internal revenue code that would govern the taxation of CCF Program income in all of its complexities—as a "Swiss watch" mechanism for program income deferrals and recognition—with express provisions defining its Swiss watch relationship with designated sections of the Internal Revenue Code of 1954. In its initial publication as the amended section 607 of the 1936 Act, this single section occupied 7 full-text printed pages in the Appendix to Title 46. The follow-on implementing regulations as they appear today in Parts 390 and 391 of the Code of Federal Regulations occupy almost 50 pages, more than 20 pages of which are devoted to the federal income tax rules. These provide a regime with rules for: (i) "qualifying" income and deposits, with four deposit classes and four deposit sub-ceilings, and three deposit accounts; (ii) "qualifying" withdrawals, and "non-qualifying" and "deemed" withdrawals, marshaling rules for the variously defined withdrawals, related vessel basis adjustments and income recognition, and first in/first out and last in/first out accounting, and interest charges on tax payments; and (iii) computations of and accounting for additions to and withdrawals from each of the three accounts, year by year and over the course the vessel lives and financing transactions. When the CCF Program was introduced in the 1970s it was sufficiently complex to require tax accounting specialists in simple vessel owner-operator contexts. When the 1970 Act Program vessel ownership and operation were separated in lease financing operations, and attempts were made to optimize and then quantify CCF Program benefits, in order to provide charter hire benefit reductions, the accounting task became so complex that it was simply abandoned. In later years, subsequent attempts to develop to an accounting model that would allow vessel owners and operators to optimize and quantify CCF Program benefits have always failed.

BRIEF DESCRIPTION OF THE DRAWING

The following detailed description can be read in connection with the accompanying drawings in which like numerals designate like elements and in which:

FIG. 7 is an exemplary input field that can be used for various steps in FIG. 2.

FIG. 8 is an exemplary vessel depreciation schedule that can be developed from the first step in FIG. 3.

FIG. 9 is a table illustrating an exemplary Capital Account that can result from various steps in FIGS. 3-5.

FIG. 10 is a table illustrating an exemplary first Income Account that can result from various steps in FIGS. 3-5.

FIG. 12 is a table illustrating an exemplary third Income Account that can result from various steps in FIGS. 3-5.

FIG. 13 is a table illustrating an exemplary fourth Income Account that can result from various steps in FIGS. 3-5.

FIG. 14 is a table illustrating an exemplary fifth Income Account that can result from various steps in FIGS. 3-5.

FIG. 15 is a table illustrating an exemplary sixth Income Account that can result from various steps in FIGS. 3-5.

FIG. 17 is an exemplary output display that can result from the steps in FIG. 3-5 and that can be displayed on the display in FIG. 1.

FIG. 18 is an exemplary output display that can result from the steps in FIG. 3-6 and that can be displayed on the display in FIG. 1.

FIG. 19 is a further exemplary output display that can result from the steps in FIG. 3-5 and that can be displayed on the display in FIG. 1.

FIG. 20 is a further exemplary output display that can result from the steps in FIG. 3-6 and that can be displayed on the display in FIG. 1.

DETAILED DESCRIPTION

A method and system were developed to solve many of the previously mentioned problems, especially with regard to accurately predicting and pricing CCF Program benefits. The present disclosure includes a method for quantifiably measuring the benefits of the CCF Program so that it can be effectively employed in vessel lease financing transactions. The exemplary methods and systems disclosed enable Agreement Participant owner-operators and owner-lessors to measure and manage CCF Program benefits with sufficient precision to expand the use of the CCF Program generally and to make the CCF Program available for the first time in a variety of vessel lease financing structures and situations. This lease financing availability can be expected to have a significant impact in encouraging new investment capital from both U.S. citizen and non-citizen sources because of the enhancement in transaction yields and the ability to contain the tax deferral benefit within a transaction or series of transactions.

Embodiments of the system and method disclosed can be used for the financing of maritime vessels that are operated under U.S. flag registry and documented under Chapter 121, Documentation of Vessels, of Title 46 of the United States Code. More particularly, the present disclosure relates to a system and method for the financing of ocean going and other maritime vessels by making use of computer models that facilitate the management of the capital construction fund tax deferral program, as initially authorized in Public Law 91-469, and now governed by the terms of Chapter 535, Capital Construction Funds, of Title 46 of the United States Code, as administered by the Maritime Administration in the United States Department of Transportation, and the National Oceanic and Atmospheric Administration in the United States Department of Commerce, in a fashion that will, among other benefits, enable a CCF Program participant to maximize its CCF Program benefits, and to thereby reduce the fully financed costs of vessels purchased, and the demise charter hire costs of vessels leased, for vessels that are purchased or leased for operation in CCF Program qualifying trades.

Figure 1:
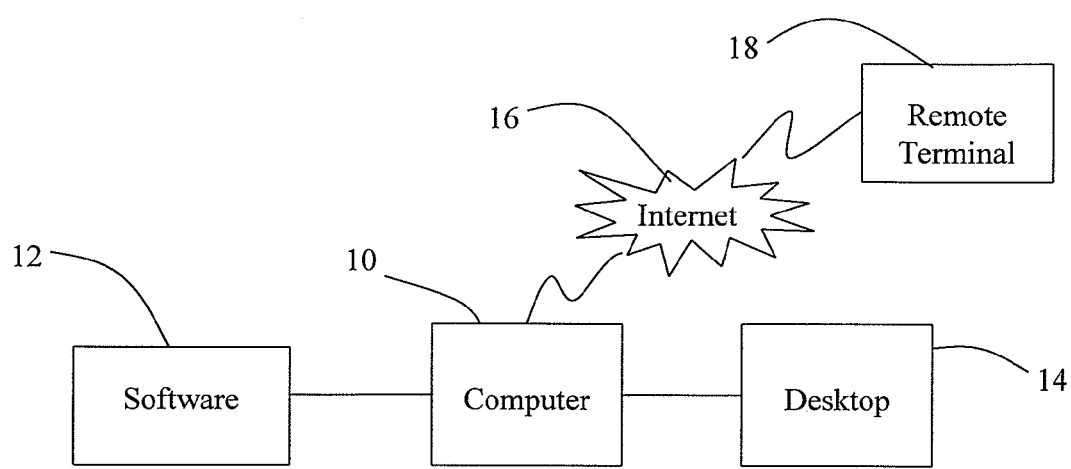
FIG. 1 is a conceptual diagram illustrating an exemplary embodiment of a system for pricing and managing the financing of a vessel.

An exemplary embodiment of a system for pricing a vessel transaction utilizing a CCF includes an input, processor, and display. At least one embodiment of such a system is shown in FIG. 1. The system includes a computer 10 containing a desktop 14, which can include input and display. The computer further contains software 12 that enables the computer to perform at least a method of pricing a vessel transaction utilizing a CCF. In other embodiments, the input and/or the display are at a remote terminal 18 that is connected to the computer 10 by the internet 16.

The input enables a user to input information regarding the vessel transaction. The input can include among other devices a keyboard, touchpad, optical scanning device, or digital information provided from a secondary source. The display displays results from the processor. The display can include among other devices a monitor, screen, digital information stored on a disk, printed document, or e-mail. The input and/or the display can be directly attached to the processor by a wired connection, or by other non-hardwired connections such as wireless connection, network connection, or a connection via the internet.

In an exemplary embodiment, the input and/or the display are devices for inputting and outputting to a remote terminal of the user. That remote terminal can be connected through the internet or other remote connection to a central computer containing the software that enables the processor. The central computer would then process the computations and send the results back to the display at the remote terminal.

In a further exemplary embodiment, the central computer containing the processor is connected to multiple inputs and multiple displays at various remote locations. This system enables multiple users simultaneously to access a single processor for pricing different vessel transactions. In the same manner; in other embodiments, the software can be added to each individual user's computers to allow the processor to be located at multiple locations for individual users. Further, combinations of the central processor and multiple individual processors can be used simultaneously in yet further embodiments.

The input, processor, and display are at least capable of performing the steps of a method for controlling a computer to price a vessel transaction utilizing a CCF. An exemplary method performed by the processor includes adding amounts for each of a determined number of years to a CCF Capital Account; calculating income on the Capital Account and adding the calculated income to an Income Account; calculating income on the Income Account and adding the calculated income to the Income Account; subtracting a value based on each principal payment from the Capital Account until the balance of the Capital Account is a first predetermined amount; subtracting remaining principal payment amounts after the Capital Account is the first predetermined amount from the Income Account; and calculating the number of years and amount each year to add to the Capital Account to enable the desired amount from a final desired principal payment for the financing of the vessel to be withdrawn from the Income Account such that the balance of the Income Account is a second predetermined amount.

A further exemplary method performed by the processor includes calculating annual depreciation, adding amounts based on the depreciation of the vessel for each of a determined number of years to a CCF Capital Account, calculating income on the Capital Account and adding the calculated income to an Income Account, calculating income on an Income Account, and adding the calculated income to a subsequent Income Account a certain number of times to create a certain number of Income Accounts. Those steps are followed by subtracting a value based on each principal payment from the Capital Account until the balance of the Capital Account is a first predetermined amount, subtracting remaining principal payment amounts after the Capital Account is the first predetermined amount from the Income Accounts, and calculating the number of years and amount of the depreciation of the vessel to add to the Capital Account to enable the final principal payment for the financing of the vessel to be withdrawn from Income Accounts such that the balance of all Income Accounts is a second predetermined amount.

Figure 2:
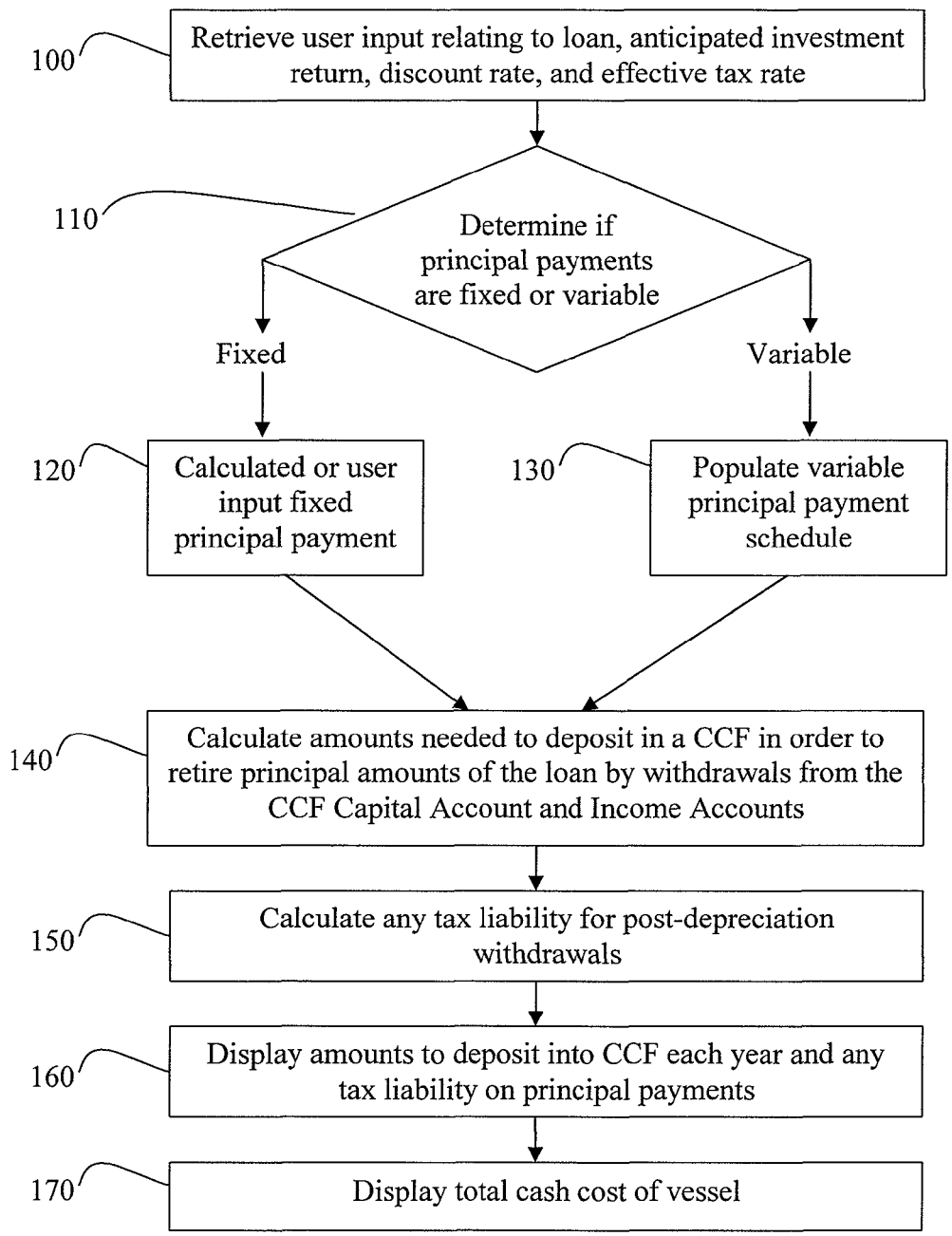
FIG. 2 is a flow chart describing an exemplary embodiment of a method for pricing a vessel with use of a CCF account.

An exemplary method for pricing a vessel transaction utilizing a CCF is shown in FIG. 2. Step 100 of the exemplary method includes retrieving input from a user regarding at least financing information and a projected investment rate of the CCF. The input also may include a tax book value of the vessel and a net present value discount rate. In further exemplary methods, the financing information for the transaction includes at least one of the terms of the loan, the initial value of the loan, the interest rate of the loan, and the number of loan payments per year. For example, based on the current CCF Program and Title XI Program, the term of the loan will be up to 25 years. However, the term may be more or less depending on the loan negotiated with the financer. In the same manner, the initial value of the loan, interest rate, and number of loan payments per year are dependent on the external negotiations of the parties involved. Therefore, this information must be provided by the user on each individual pricing situation. FIG. 7 shows an exemplary input field 600 that can be used by the user to input the requested information.

The projected investment rate of the CCF is another user determined value that is input into the system during the user input step. When pricing the vessel using the CCF before purchase of the vessel and before payments on the vessel commence, the pricing is based solely on the projected investment rate. However, as payments begin to be made and actual investment amounts become known, the projections are typically no longer accurate. In one embodiment, these inaccuracies can be cured by allowing the user to input actual investment rates for the previous years in addition to the projected investment rate for subsequent years. The results of the method would then be affected by the adjustment. In another embodiment, these inaccuracies can be cured by allowing the user to manually update the account balances of the Income Accounts to correspond to the actual amount of income received during the period for which the balances are updated.

In a further embodiment, the step of retrieving input from a user further includes input of the effective tax rate of the vessel purchaser. The effective tax rate is used during subsequent steps of the method either to provide the possible tax consequences of certain results of the CCF and/or to display the tax savings to the vessel purchaser by using a CCF.

Step 110 of an exemplary method includes determining if principal payments are fixed or variable. This determination is provided by the user typically in the input field 600. Under the current rules of the CCF Program and Title XI Program, the money from the CCF can only be used for the principal of the loan and does not include interest on the loan caused by financing. Thus, the interest typically is paid with funds outside the CCF Program. However, to get a complete and accurate-price of the vessel, the method may also incorporate an interest calculator to determine the interest to be paid during the term of the loan. In some loans, the principal payment may be fixed during the entire term of the loan, so that the loan decreases at a steady rate, but the overall payment including the interest on the loan will decrease as the interest decreases. In other loans, the principal payment may be variable during the term of the loan. One use of variable principal payment loans is where the total payment including principal and interest remains fixed, so that as the loan amount decreases, the interest decreases, and the principal payment increases.

In an exemplary embodiment of the method, when the user inputs fixed principal payments, for example in the input field 600, Step 120 is initiated. In Step 120, the payment amount is input by the user or calculated by the processor. The amount can be calculated by the processor based on the input amount of the loan, and the term of the loan. In the same manner, if the amount of each principal payment is input and one of either the amount of the loan or the term of the loan is input, then the other can be calculated by the processor.

Where the principal payment is variable, Step 130 is initiated. In Step 130, a variable principal payment schedule is populated. The schedule can be manually filled in by the user. In other embodiments, the processor can fill in the schedule, especially where the variable principal payments are based on the amount of interest at each payment when attempting to have an equal overall payment amount. In this embodiment, the processor can prepare the schedule based on the total payment amount intended, the interest rate, the total amount of the loan, and the term of the loan.

Figure 3:
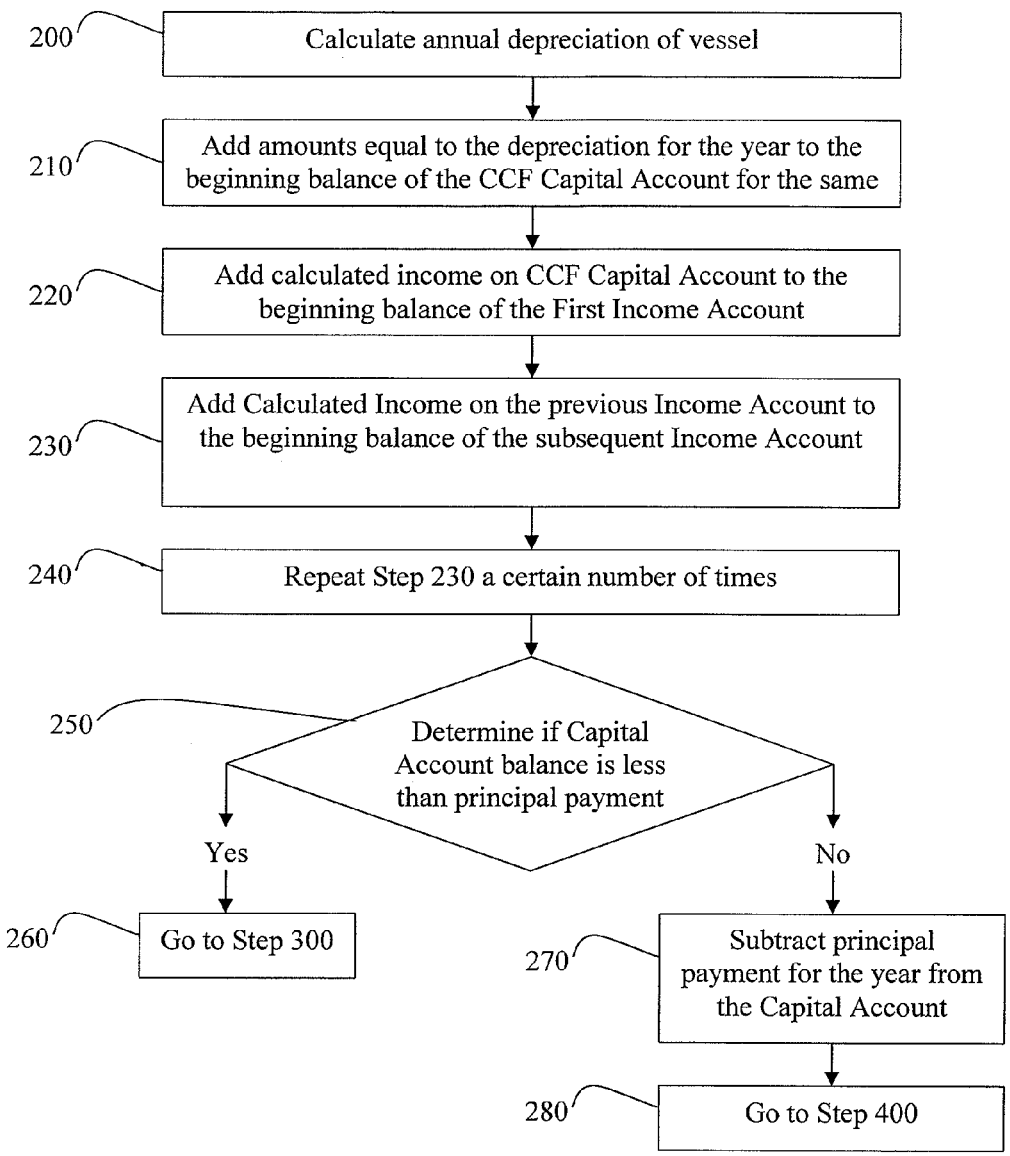
FIG. 3 is the first part of a flow chart describing an exemplary embodiment of a method for performing the first calculation step in FIG. 2.
Figure 4:
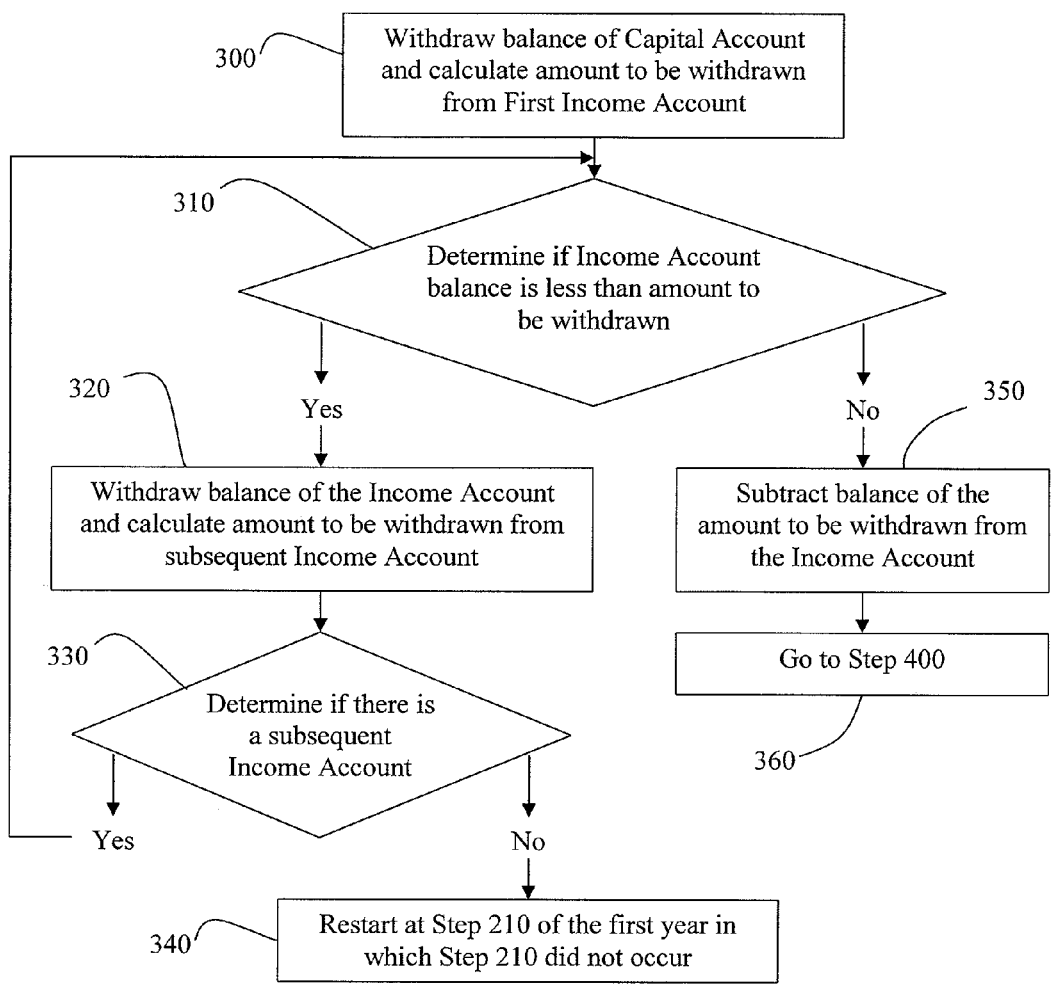
FIG. 4 is the second part of a flow chart describing an exemplary embodiment of a method for performing the first calculation step in FIG. 2.
Figure 5:
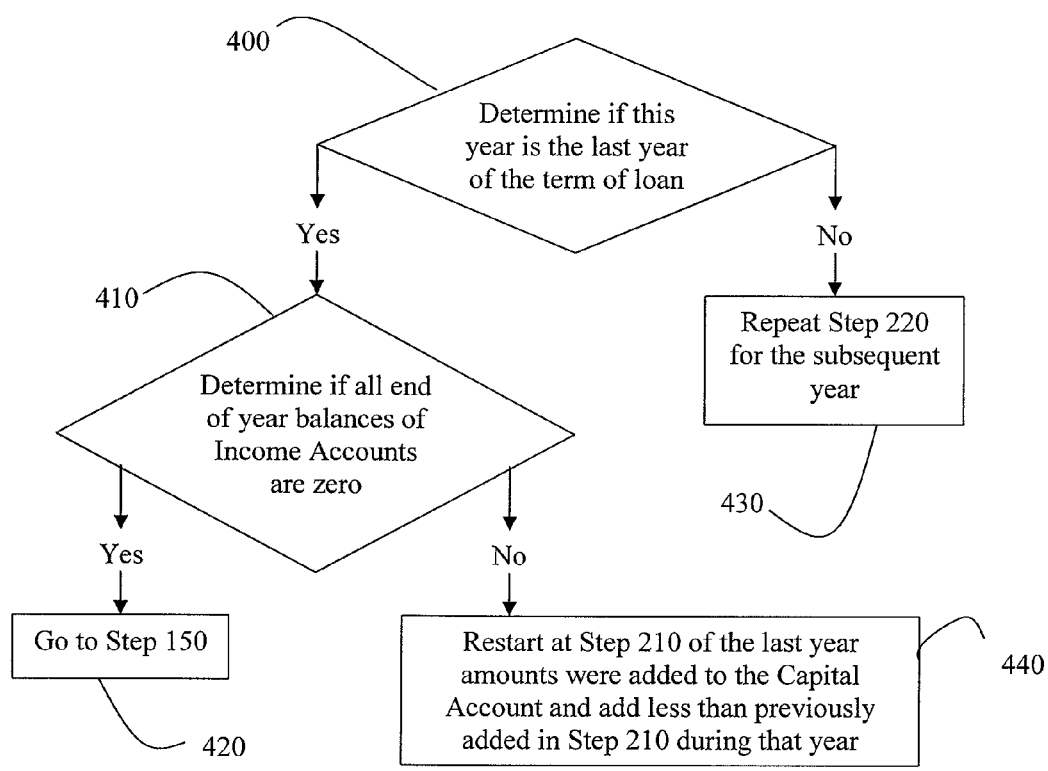
FIG. 5 is the third part of a flow chart describing an exemplary embodiment of a method for performing the first calculation step in FIG. 2.

Once all of the principal payment amounts are determined either through the fixed amount or the variable payment schedule, Step 140 is performed. Step 140 includes calculating amounts needed annually to deposit in a CCF in order to retire the principal amounts of the loan by withdrawals from the CCF Capital Account and Income Accounts. One exemplary method for performing the calculations of Step 140 is described below as shown in FIGS. 3-5.

Figure 6:
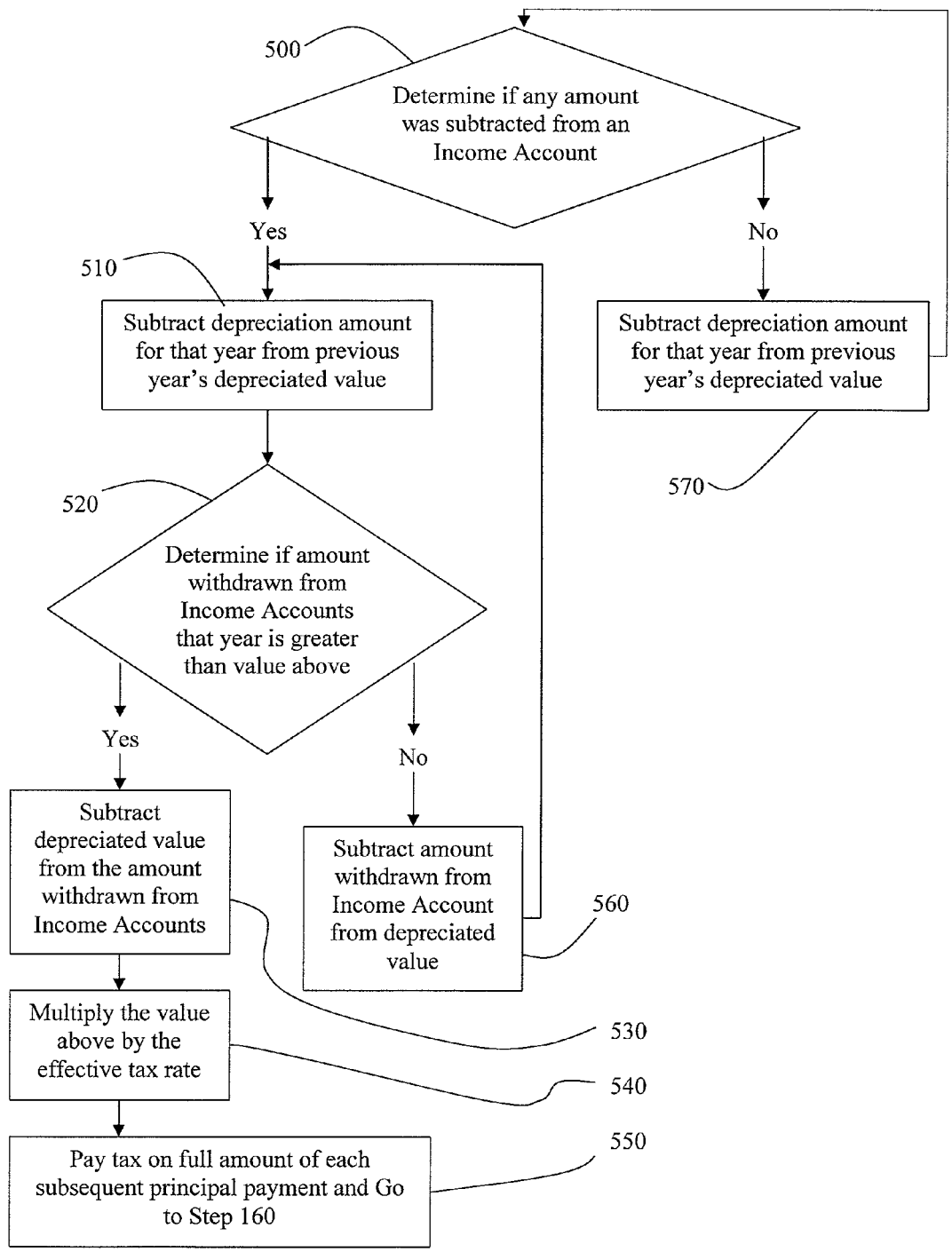
FIG. 6 is a flow chart describing an exemplary embodiment of a method for performing the second calculation step in FIG. 2.
Figure 11:
FIG. 11 is a table illustrating an exemplary second Income Account that can result from various steps in FIGS. 3-5.
Figure 16:
FIG. 16 is a table illustrating an exemplary seventh Income Account that can result from various steps in FIGS. 3-5.

After completion of Step 140, Step 150 is performed. Step 150 includes calculating any tax liability the vessel purchaser may obtain based on post-depreciation withdrawals from the CCF. Post-depreciation withdrawals from the CCF are a result of the depreciation of the vessel being accelerated by debiting principal payments from Income Accounts. Whenever a principal payment is debited from Income produced by a CCF, then the amount debited is applied to the depreciation value of the vessel. In this way the vessel is depreciated at higher amounts than depreciation tables would indicate. Once the vessel is fully depreciated, any money debited from the CCF to pay down the principal remaining on the loan for the vessel is a post-depreciation withdrawal subject to taxes. One exemplary method for performing the calculations of Step 150 is described below as shown in FIG. 6.

In one embodiment, after calculating the Capital Account deposits and tax liability, the total cost of the vessel can be calculated by summing the deposits and tax liabilities. Further the total cost of the vessel can be calculated on a net present value basis by using the net present value discount rate input by the user.

After completion of the calculating steps, Step 140 and Step 150, the method includes display steps, Step 160 and Step 170. Step 160 includes a display illustrating the amount a vessel purchaser should contribute into a CCF each year based on the calculations of Step 140, and the tax liability on principal payments based on the calculations of Step 150. Step 170 includes a display that illustrates the total cash cost of the vessel using the CCF. The total cash amount can be displayed as real cash or net present value of cash flow calculated based on the net present value discount rate. Additionally, a total cost of the vessel when not utilizing a CCF also can be displayed, both as real cash or net present value in order to show the cost savings created by the CCF.

Examples of the display of Step 160 are shown in FIGS. 19 and 20. CCF Contribution Output Display 1800 is an example of a display presenting the amounts to contribute to a CCF each year resulting from following the exemplary method of FIGS. 2-6. In addition to the real cash amount to contribute each year to the CCF, CCF Contribution Output Display 1800 further presents the net present value of the real cash amount to contribute each year and the total real cash and net present value contribution amount over a certain number of years. The year in which net present value is based can be changed to a different year depending on the current year in relation to the payment schedule. For example, if the pricing method is being used to project cost of a purchase to be made more than a year in the future, the net present value can be adjusted accordingly. Likewise, if the pricing method is being used to project further anticipated cost after already contributing for a certain number of years, the net present value can be adjusted in that manner as well. FIG. 20 illustrates an example of a display presenting the amount of tax liability for each year that such a liability exists, and the total tax liability on any principal payments made from post-depreciation withdrawals from the CCF. Similar to CCF Contribution Output Display 1800, the Tax Liability Output Display 1900 also includes real cash tax liability and net present value tax liability, and the net present value can be adjust in the same manner as for CCF Contribution Output Display 1800.

The method may include further display steps that include display of other summary information. For example, FIG. 17 illustrates an exemplary Summary Information Display 1600 containing the total of all Income Accounts. Specifically, the Summary Information Display 1600 shows the total of all Income Account balances for the beginning of each year, the total income deposits from each year, the total withdrawals from all of the Income Accounts for the year, and an end of year balance for the total of all Income Accounts. FIG. 18 shows another optional display, Tax summary display 1700. FIG. 18 includes the total withdrawals made for the CCF for each year, the CCF adjusted tax book value of the vessel at the end of each year, any non-qualified withdrawals for each year, and CCF balance at the end of each year.

Figure 21:
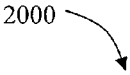
FIG. 21 is a further exemplary output display that can result from the steps in FIG. 3-6 and that can be displayed on the display in FIG. 1.
Figure 22:
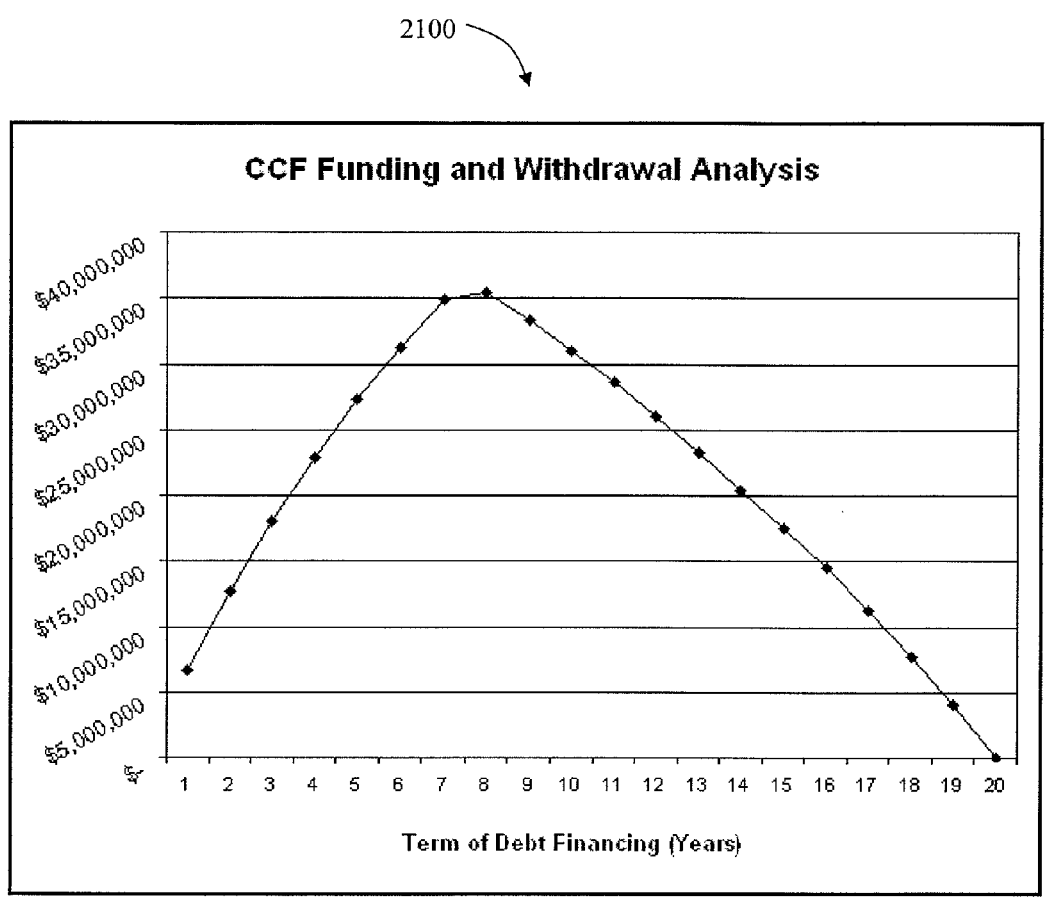
FIG. 22 is a graph illustrating exemplary CCF funding and withdrawal analysis.

Examples of displays according to Step 170 include tables and/or graphs displaying the total cash cost of a vessel on a real cash basis, net present value basis, or both. In one embodiment, the total cost display is similar to FIG. 21. FIG. 21 includes total CCF contributions, total tax liability, and total cash cost of the vessel both on a real cash flow basis and on a net present value cash flow basis. FIG. 22 is an example of displaying information according to Step 170 by use of a graph. FIG. 22 illustrates the CCF balance versus the term of debt so as to allow a user to analyze the CCF funding and withdrawal trend of the account.

In one embodiment, all of the displays and any displays similar to the displays shown in FIGS. 7-22 may be displayed. However, in other embodiments, the method may include displaying additional information or less information. How much information to display and which displays in particular to display will depend on the intended user. Fewer displays will provide the same important information in a simpler format. However, more displays can help the user feel more comfortable with the results, because the user can see many of the intermediate results.

Calculating the Amounts and Number of CCF Capital Account Deposits

FIGS. 3-5 is a flow chart providing an example of a method of calculating amounts needed annually to deposit in a CCF in order to retire principal amounts of the loan by withdrawals from the CCF Capital Account and Income Accounts. The first step, Step 200 involves calculating the annual depreciation of the vessel. As mentioned above, the CCF Program involves an Agreement between the CCF Program participant and the government. Many Agreements specify a deposit ceiling in which the CCF Program participant's deposits may not exceed the measure of its depreciation deductions for the vessel or vessels purchased or to be purchased and receipts from the investment or reinvestment of amounts on the Capital Account. Therefore, it can be beneficial to establish a deposit ceiling for each year equal to the depreciation for the year.

Calculation of the depreciation of the vessel can follow any depreciation method. However, in order to effectively utilize the depreciation deductions, one of the approved methods should be used. For example, the depreciation can be calculated using straight line depreciation, double declining balance depreciation, or crossover depreciation. Usually the depreciation is calculated on an annual basis. Straight line depreciation is a method of computing depreciation in which the depreciable cost (historical or purchase price) of a tangible capital asset is reduced by an equal amount in each accounting period (usually a year) over the asset's estimated useful life. Straight line depreciation is computed as a fixed expense by dividing the asset's depreciable cost by the number of years the asset is estimated to remain in service. Double declining-balance depreciation is a method of computing depreciation in which the written-down or book value of a capital asset is reduced by double the depreciation rate of the straight line depreciation method. The double declining-method allows accelerated depreciation, which provides for a higher deposit ceiling in Agreements where the deposit ceiling is pegged to the depreciation amount.

Crossover depreciation provides a combination of straight line depreciation and double declining-balance depreciation. The crossover depreciation allows accelerated depreciation at the beginning to allow higher initial depreciation deductions, with the more stable straight line depreciation at the end to allow substantial depreciation deductions for the life of the vessel. The crossover depreciation begins with double declining-balance depreciation and crosses over to straight line depreciation. The crossover from double declining-balance depreciation to straight line depreciation is at the year in which the straight line depreciation value would have been greater than the double declining-balance value. From that year on, the crossover depreciation amount for each year equals the straight line depreciation value based on that year's tax book value and the remaining number of years left for depreciation.

An example of a vessel depreciation schedule is shown in FIG. 8. The vessel depreciation schedule 700 in FIG. 8 shows an example of depreciation over a 20 year estimated useful life for a vessel beginning with a tax book value of $105,236,054. As shown in the vessel depreciation schedule 700, year 8 is the first year that the straight line depreciation amount is greater than the double declining-balance depreciation amount. Therefore, that is the crossover year. Starting with the crossover year, the straight line depreciation amount is determined based on the tax book value of the vessel that year and the number of remaining years in the estimated useful life of the vessel. In the vessel depreciation schedule 700, the tax book value of the vessel at the beginning of the crossover year is $46,462,226 and there are 13 remaining years of the estimated useful life of the vessel. Therefore, in the example starting with year 8 the depreciation for each year is $3,871,852. Based on the vessel depreciation, the tax book value for each year under crossover depreciation is also determined.

The vessel depreciation schedule 700 can be displayed and accessible to the user. However, because the schedule typically requires no manual adjustment and is based on established depreciation methods, the vessel depreciation schedule 700 may not be displayed in order to simplify the information provided to the user.

After calculating the annual depreciation of the vessel, the amount to add to the CCF Capital Account for the first year can be added as shown in Step 210. As mentioned above, typical CCF Agreements provide that the annual depreciation amount is the deposit ceiling for the CCF Capital Account. Therefore, the amount deposited in the CCF Capital Account in any given year of the CCF may be in an amount up to the depreciation of the vessel for the year. However, where the deposit amount is not capped by the annual depreciation, the deposited amount can be based on other factors, and the depreciation schedule does not need to be prepared. To maximize the income potential of the CCF when capped by the amounts of the annual depreciation of the vessel, and thus to minimize the total amount of deposits required in the long-term, the added amount is equal to the depreciation for the year. However, other business concerns for the vessel purchase may necessitate a smaller addition in any given year of the CCF.

In order to maximize the annual income on the Capital Account, the deposit for each year can be made in a lump sum on the first of the calendar year. However, for other business reasons, the deposit may be made at a different time of the year, and may be made in installment payments, for example, semi-annually, quarterly or monthly. Similarly, to maximize the annual income on the Capital Account, the withdrawal for principal payment each year can be made in a lump sum on the last day of the calendar year. However, for purposes of meeting the financing contract, the payments may need to be paid at a different time of the year and/or in multiple payments, for example, semi-annually, quarterly or monthly. Finally, the end of year account balance is equal to the beginning of year account balance plus the deposits for the year minus the withdrawals for the year.

A table illustrating an example of Step 210 is shown in FIG. 9. The Capital Account table 800 includes the annual crossover depreciation amounts from the vessel depreciation schedule 700 and the annual principal payments from the input field 600. Additionally, the Capital Account table 800 includes a beginning of the year balance, yearly deposits, yearly withdrawals, and end of year balance for a Capital Account. In this example, the amount added to the beginning balance of the CCF Capital Account is equal to the vessel depreciation for the year until the total CCF contribution amount is deposited.

For each year of the CCF, Step 220 is performed. In Step 220 income is calculated on the Capital Account balance and added to the beginning balance of the First Income Account. For tax and purposes of fulfilling the CCF requirements, income on the Capital Account is shown in a separate account. The income on the Capital Account is typically determined based on the Capital Account balance and the projected or actual income rate. However, the user can be granted the ability to manually enter the amount of income on the Capital Account in the First Income Account (i.e., the Income on Capital Account). If the method is being used for pricing the transaction prior to any deposits or withdrawals, then the income is based on projected income rate. However, where the method is being used after deposits and withdrawals have commenced, then the income can incorporate actual income rates along with projected income rates for future years. In situations where the yearly deposit is not made in a lump sum amount on the first day of the year and/or where the yearly withdrawal is not made in a lump sum amount on the last day of the year, the fluctuating balance throughout the year can be incorporated in the income calculation and calculated using compound rate of return calculations.

An example of a First Income Account table 900 illustrating Step 220 is shown in FIG. 10. Similar to the Capital Account table 800, the First Income Account table 900 includes a beginning of year balance, yearly deposit, yearly withdrawal, and end of year balance. For ease of calculations, the income on the Capital Account is based on the assumption that the yearly deposit was made in a lump sum on the first day of the year and the yearly deposit was made in a lump sum on the last day of the year, and that the income is calculated on the last day of the year just prior to the yearly withdrawal, if any. However, the method will include the more complicated embodiment where the income is accumulated periodically throughout the year on a variable Capital Account balance. In the example, based on the 7% projected income rate provided by the user in Step 100, each yearly deposit in the First Income Account is 7% of the sum of the beginning balance and yearly deposit in the Capital Account.

Similar to Step 220, Step 230 adds calculated income on a previous income account to a subsequent income account using the same assumptions as for the First Income Account. Further, the income on income accounts can be calculated using any of the methods described above with regard to income on the Capital Account. Additionally, the income on all of the income accounts and the Capital Account can follow the same method of income calculations. For example, income on the First Income Account based on the projected or actual income rate is added to the beginning year balance of the Second Income Account (i.e., the Income on First Income Account). An example of this step is illustrated by the Second Income Account table 1000 in FIG. 11. In the example illustrated by the First Income Account table 900 and Second Income Account table 1000, the income is added to the account balance on the last day of the year, and thus the income to be added to the subsequent income account is calculated based on the income rate and the beginning year balance of the previous income account. For example, the yearly deposit of income on the First Income Account for year 2 is $51,566, which is 7% of the beginning year balance of the First Income Account for year 2, $736,652.

Step 230 is repeated a certain number of times and in so doing a certain number of income accounts are created. The number of times Step 230 is repeated will be one time less than the number of Income Accounts created. Each subsequent income account is pulling income from a smaller balance. Therefore, eventually, a subsequent income account is pulling such little income that it is no longer a significant amount. The number of income accounts can be a high number to ensure that all useful income is captured in the pricing method, or the number of income accounts can be a low number to lower the computing power required to calculate the amounts.

In one embodiment, the number of income accounts is 4 to 10. In a further embodiment, the number of income accounts is 6 to 8. In the example method illustrated by the tables shown in FIGS. 9-16, there are 7 income accounts. As can be seen from the Seventh Income Account table 1500 shown in FIG. 16, over the 20 year period of the CCF the Seventh Income Account accumulated only $10,509 (or about 0.01% of the total loan for a vessel to which the income account will be applied).

In one embodiment, the certain number of Income Accounts is a fixed constant used in the method for each transaction pricing. By using a fixed constant, the method can be simpler with less calculation or user input required. In another embodiment, the certain number of Income Accounts can be a user input. Such a user input allows the user to have more control over the pricing method.

In a further embodiment, the certain number of Income Accounts can be calculated by the processor based on the balance of the subsequent Income Accounts. The balance of the subsequent Income Account can be evaluated based on a ratio of the balance to the total purchase price of the vessel or the total financed amount in relation to a predetermined ratio. For example, the certain number of Income Accounts can equal the number of Income Accounts needed where the last Income Account has a balance less than or equal to a predetermined ratio and the Income Account previous to the last Income Account has a balance greater than a predetermined amount. The predetermined ratio can be a fixed constant in the method applied to numerous transactions or an input from the user.

In a further embodiment, the number of Income Accounts employed can increase until the income on the last Income Account equals zero, thus mathematically maximizing the amount of income that may be derived from the CCF. The choice to employ this embodiment likely would be based upon a determination of whether the incremental benefit of the additional income would outweigh the cost of administration of the additional Income Accounts.

In a further embodiment, the balance of the subsequent Income Account can be evaluated based on its total balance in relation to a predetermined amount. For example, the certain number of Income Accounts can equal the number of income accounts needed where the last income account has a balance less than or equal to a predetermined amount and the income account previous to the last income account has a balance greater than a predetermined amount. The predetermined amount can be a fixed constant in the method applied to numerous transactions, an input from the user, or a certain percentage of some other value. Some other value could include, for example, a single principal payment, the purchase or financed price of the vessel, or the average daily, weekly, monthly or yearly income produced by the vessel either by leasing or use. The certain percentage of some other value could be a fixed constant applied to numerous transactions or an input from the user.

In an alternative embodiment, all income from both the Capital Account and the Income Account can be deposited into the Income Account. In this manner Step 220 would be followed as indicated in the flow chart, but Steps 230 and 240 would be replaced by a single step of adding calculated income on the Income Account to the beginning balance of the Income Account.

Amounts based on each principal payment are subtracted from the Capital Account until the balance of the Capital Account is a first predetermined amount. To maximize the benefit of the CCF, the total of each principal payment should be subtracted from the Capital Account until the balance of the Capital Account is a first predetermined amount. However, for business reasons the vessel purchaser may determine that only part of the principal payments should be subtracted from the Capital Account. There may also be business reasons to subtract more than the principal payment from the Capital Account, but this likely will cause tax liabilities. The CCF Program currently requires that the Capital Account be exhausted prior to any Income Account money being used. Therefore, in at least one embodiment, the first predetermined amount is zero.

When the Capital Account balance reaches the first predetermined amount and principal payments remain to be paid from the CCF, then the remainder is subtracted from the Income Accounts. Amounts are subtracted from the First Income Account until the First Income Account balance reaches a second predetermined amount and the remainder from the Second Income Account until that balance reaches a third predetermined amount and so forth until the last Income Account reaches its predetermined amount. To maximize the amount of income created by the CCF, the predetermined balance for each of the Income Accounts should be zero. In this manner, the principal payments are each made from one income account until that income account reaches a balance of zero before withdrawing amounts from any subsequent income account. However, there may be reasons for the vessel purchaser to desire an income balance be carried in the income accounts after all principal payments are paid. Therefore, the predetermined amounts for the income accounts can be an amount input by the user, a fixed amount applied to multiple transactions, or a calculated amount based on a predetermined percentage of the price of the vessel, single principal payment, income on the vessel, financed cost of the vessel, or other value. The predetermined percentage can be a percentage input by the user or a fixed percentage applied to multiple transactions.

The method further includes a step of calculating the number of years and amount of the depreciation of the vessel to add to the Capital Account to enable the principal payments for the financing of the vessel desired to be withdrawn from the Capital Account and Income Accounts such that the balance of each account ends at a predetermined amount. For discrete use of the CCF in transaction financing, it is desired that all principal payments for the financing of the vessel be withdrawn from the Capital Account and Income Accounts. In at least one embodiment, the predetermined amount in each of the Capital Account and the Income Accounts is zero. By exhausting all of the accounts with the last principal payment, the CCF funds subject to non-qualified withdrawals and tax liability can be limited.

The calculation of the number of years and the amount of the depreciation of the vessel to add to the Capital Account can be determined separately or calculated by the processor by a back calculation from the final result desired. One embodiment for the method to calculate the amount of depreciation to deposit in the Capital Account is illustrated in the flow chart of FIGS. 3-5. In that embodiment, the entire amount of the depreciation for the year is intended to be deposited when needed; the Capital Account and all Income Accounts are to end with a balance of zero; and all principal payments are to be paid from the Capital Account and/or Income Accounts.

The method includes calculating the annual depreciation of the vessel in Step 200 by any of the methods described above. Next an amount equal to the depreciation for the year is added to the beginning balance of the CCF Capital Account for that year in Step 210. In Step 220, income on the CCF Capital Account is calculated and added to the beginning balance of the First Income Account. In Step 230, income on the previous Income Account is calculated and added to the beginning balance of the subsequent Income Account. In Step 240, Step 230 is repeated a certain number of times. The specific number of times is determined by one of the methods described above. In Step 250, the processor determines if the Capital Account balance is less than the principal payment. If yes, then as indicated in Step 260, Step 300 is performed. If no, then the principal payment is subtracted from the Capital Account in Step 270 followed by performing Step 400 as indicated in Step 280.

In Step 300, the balance of the Capital Account is withdrawn and the amount of the principal payment remaining is calculated. In Step 310, the processor determines if the Income Account balance is less than the Amount of principal payment remaining to be paid. If yes in Step 310, then the balance of the Income Account is withdrawn and the amount of the principal payment remaining is calculated in Step 320. Following Step 320, in Step 330 the processor determines if there is a subsequent Income Account. If yes in Step 330, then the processor goes back to Step 310 and determines if that Income Account balance is less than the amount to be withdrawn. If no in Step 330, then the processor returns to Step 210 and performs the step for the first year in which Step 210 was not performed previously. If no in Step 310, then the remainder of the principal payment is subtracted from the Income Account in Step 350. Step 350 is followed by Step 360 indicating that Step 400 should be performed.

In Step 400, the processor determines if the principal payment just paid in Step 350 was the last payment of the loan. If yes in Step 400, then the processor determines if all balances of Income Accounts are zero in Step 410. If yes in Step 410, then the amount of depreciation for each year to be deposited in the Capital Account is fully calculated. As indicated in Step 420, the processor at that point could move on to Step 150 in an exemplary general method to which the calculation was one step. If no in Step 410, then the processor adds less to the Capital Account in the last year that amounts were added than the amount added previously in Step 210 and continues the method from Step 210 as indicated in Step 440. If no in Step 400, then the method repeats starting with Step 220 as indicated in Step 430.

An example of the results of the method illustrated in the flow chart of FIGS. 3-5 is shown in the tables of FIGS. 9-16. In each of the Capital Account and the Income Accounts the final account balance is zero. Further, the final payment is fully paid from withdrawals from the Third, Fourth, Fifth, Sixth, and Seventh Income Accounts. As shown in FIG. 9, the yearly deposits to the Capital Account equal the annual depreciation amounts for each of years 1-7. In year 8, a part of the annual depreciation amount is deposited. No deposit is made in the Capital Account for the remaining years 9-20.

The exemplary method of FIGS. 3-5 and the example results presented in FIGS. 9-16 each represent an embodiment in which the method is used for projected pricing of a vessel transaction using a CCF. In an alternative embodiment, the method can be used to manage the CCF after the transaction has been completed. Any projected pricing prior to the vessel transaction will be based on values that may change. A particular example of a value that will likely change from the projection is the investment rate of return. Therefore, when managing the CCF it may be necessary to update the assumptions in the method, especially with regard to the actual income created each year in which the CCF has been in existence.

When using the method in the alternative managing mode, the method can be used to allow the vessel purchaser to either adjust the amount of deposits to make to the Capital Account or project the amount of tax liability they may be incurred to withdraw remaining funds after the loan is fully paid. If not all of the Capital Account deposits have been made when the actual income is updated, then the method can be used substantially in the same method as described above for determining the amount of deposits to make to the Capital Account. The differences would be to manually input or update previous deposits and income amounts, and then allow the method to proceed from the current year. If the actual investment rate of return on the CCF was higher than projected, then the method will provide an updated amount of deposits that will be less than projected. If the actual investment rate of return on the CCF was lower than projected, then the method will provide an updated amount of deposits that will be higher than projected.

If all of the Capital Account deposits projected have already been made and after updating with actual values the results are that there will not be enough money in the CCF to pay all of the principal payments, then the method can be started from the current year. The method will provide deposit amounts to increase the Capital Account or Income Account balances, subject to the applicable contribution limitations, so that the final principal payment is paid from the CCF and the Capital and Income Accounts end with a zero balance. If all of the Capital Account deposits projected have already been made and after updating with actual values the results are that there will be money left over in at least one of the accounts after the last principal payment is made, then the method can be used to determine how much will be remaining. In a further embodiment, the processor can include a further method for determining the projected or actual tax liability on any of the remaining balance.

Calculating Post-Depreciation Withdrawal Tax Liabilities

FIG. 6 shows a flow chart illustrating an exemplary method of performing Step 150. According to the current laws, any withdrawal from a CCF account after the vessel is fully depreciated will incur tax liability. In at least one embodiment, the pricing method can include a step of calculating any tax liability for post-depreciation withdrawals. When paying principal payments from a Capital Account that contains only deposits equal to or less than the annual depreciation amounts, the vessel is depreciated at the rate according to the vessel depreciation schedule. However, when Income Accounts are used to pay at least a portion of the principal payments, then according to the current laws, the vessel is depreciated by the additional amount withdrawn from an Income Account. Therefore, during the time period in which all withdrawals are taken from only the Capital Account, the vessel depreciation at the end of the year equals the beginning of year depreciation value minus the value of the depreciation for that year from the depreciation schedule. During the time period in which at least a portion of the principal payments are withdrawn from an Income Account, the vessel depreciation at the end of the year equals the beginning of year depreciation value minus the value of the depreciation for that year from the depreciation schedule minus the amounts withdrawn from any Income Accounts that year. Therefore, the vessel will be fully depreciated prior to the last withdrawal.

Any withdrawal amount made after the vessel is fully depreciated is subject to tax liability. Under current law, the post-depreciation withdrawals are taxed at the effective tax rate of the vessel purchaser. In at least one embodiment, the processor calculates the amount of post-depreciation withdrawals and divides that amount by the effective tax rate for each year following and including the year in which the vessel is fully depreciated.

An exemplary method of calculating the tax liability from post-depreciation withdrawals is illustrated by a flow chart in FIG. 6. In Step 500, the processor determines if any amount was subtracted from an Income Account in that year, beginning with the first year of withdrawals from the CCF. If yes in Step 500, then subtract depreciation amount found in the depreciation schedule for that year from the previous year's depreciated value as indicated in Step 510. Then in Step 520, the processor determines if the amount withdrawn from Income Accounts that year is greater than the resulting value from Step 510. If yes in Step 520, then subtract resulting depreciated value from Step 510 from the amount withdrawn from Income Accounts in that year as indicated in Step 530. In Step 540, multiply the resulting value from Step 530 by the effective tax rate of the vessel purchaser that was input by the user. In Step 550, multiply the effective tax rate by the total of all withdrawals from Income Accounts for each subsequent year. If no in Step 520, then subtract the amount withdrawn from the Income Account during that year from the result of Step 510 as indicated in Step 560. Then return to Step 510 for the next subsequent year. If no in Step 500, then subtract the depreciation amount for that year as found in the depreciation schedule from the previous year's depreciated value as indicated in Step 570.

Although described in connection with preferred embodiments thereof, it will be appreciated by those skilled in the art that additions, deletions, modifications, and substitutions not specifically described may be made without departure from the spirit and scope of the invention as defined in the appended claims.

What is claimed is:

1. A method for controlling a computer to price a vessel transaction utilizing a capital construction fund (CCF), the method comprising:
   a) retrieving input from a user regarding the vessel transaction including financing information and a projected investment rate of the CCF;
   b) adding amounts for each of a determined number of years to a CCF Capital Account;
   c) adding calculated income on the Capital Account to an Income Account;
   d) adding calculated income on the Income Account to the Income Account;
   e) subtracting a value based on each principal payment from the Capital Account until the balance of the Capital Account is a first predetermined amount;
   f) subtracting the value of remaining principal payments after the Capital Account is the first predetermined amount from the Income Account;
   i) calculating via a processor the number of years and amount each year to add to the Capital Account to enable the desired amount from a final desired principal payment for the financing of the vessel to be withdrawn from the Income Account such that the balance of the Income Account is a second predetermined amount, and
   j) displaying the number of years and amount each year to add to the Capital Account calculated in the calculation step.

2. The method of claim 1, wherein the calculated income added in step d) is calculated by dividing the Income Account into multiple Income Accounts.

3. The method of claim 1, wherein step d) is performed by adding calculated income on the Capital Account to an Income Account, followed by adding calculated income on a previous Income Account to a subsequent Income Account, and repeating the addition of subsequent Income Accounts until a certain number of Income Accounts are established.

4. The method of claim 3, wherein the certain number of Income Accounts is determined based on a method selected from the group consisting of a number input by the user, a fixed number, a calculation based on the balance of the subsequent Income Accounts.

5. The method of claim 1 further comprising a step of calculating the annual depreciation of the vessel.

6. The method of claim 5, wherein the amounts added to the CCF Capital Account are based on the depreciation of the vessel.

7. The method of claim 1, wherein input from a user further includes at least one selected from the group consisting of a tax book value of the vessel and a net present value discount rate.

8. The method of claim 1 further comprising a step of calculating tax liability for post-depreciation withdrawals.

9. The method of claim 1 further comprising a step of calculating the total cost of the vessel on a real cash basis or net present value basis, or both.

10. The method of claim 1 further comprising displaying the amount of the depreciation of the vessel to add each year to the Capital Account.

11. The method of claim 1, wherein the amounts added to a CCF Capital Account in any year is equal to or less than the depreciation of the vessel for that year.

12. The method of claim 11, wherein the amounts added to a CCF Capital Account in each year is equal to the amount of depreciation of the vessel for that year starting with the first year and ending with either the last or the year prior to the last of a determined number of years.

13. The method of claim 1, wherein the determined number of years is one selected from the group consisting of a user selected number of years, a calculated number of years based on the final balance of the Capital Account being equal to the first predetermined amount at a predetermined date, a calculated number of years based on the balance of the Income Account being equal to the second predetermined amount at a predetermined date.

14. The method of claim 1, wherein the value based on each principal payment subtracted from the Capital Account is the lesser of the principal payment or the balance in the Capital Account above the predetermined amount.

15. The method of claim 1, wherein the first predetermined amount is zero.

16. The method of claim 1, wherein the second predetermined amount is zero.

17. A system for pricing a vessel transaction utilizing a capital construction fund (CCF), the system comprising:
   a) an input for enabling a user to input information regarding the vessel transaction;
   b) a processor configured to add amounts for each of a determined number of years to a CCF Capital Account; to calculate income on the Capital Account and add the calculated income to an Income Account; to calculate income on the Income Account and add the calculated income to the Income Account; to subtract a value based on each principal payment from the Capital Account until the balance of the Capital Account is a first predetermined amount; to subtract remaining principal payment amounts after the Capital Account is the first predetermined amount from the Income Account; and to calculate the number of years and amount each year to add to the Capital Account to enable the desired amount from a final desired principal payment for the financing of the vessel to be withdrawn from the Income Account such that the balance of the Income Account is a second predetermined amount; and
   c) a display for displaying results from the processor.

18. The system of claim 17, wherein the input and processor may be connected by one of the group consisting of wired connection, wireless connection, connection via a network, and connection via the internet.

19. The system of claim 17, wherein the processor and display may be connected by one of the group consisting of wired connection, wireless connection, connection via a network, and connection via the internet.

20. The system of claim 17, wherein the processor is connected to multiple inputs and multiple displays.

* * * * *